US006747777B1

(12) United States Patent
Sikora et al.

(10) Patent No.: US 6,747,777 B1
(45) Date of Patent: Jun. 8, 2004

(54) REFLECTIVE MICROFLUIDICS DISPLAY PARTICULARLY SUITED FOR LARGE FORMAT APPLICATIONS

(75) Inventors: Robert M. Sikora, San Jose, CA (US); Sean P. McMahon, San Jose, CA (US)

(73) Assignee: Cymscape Incorporated, San Jose, CA (US)

(*) Notice: Subject to any disclaimer, the term of this patent is extended or adjusted under 35 U.S.C. 154(b) by 0 days.

(21) Appl. No.: 10/372,870

(22) Filed: Feb. 24, 2003

(51) Int. Cl.[7] ............................ G02F 1/03; G09F 19/00
(52) U.S. Cl. .......................... 359/253; 359/290; 40/406
(58) Field of Search ................................ 359/253, 291, 359/290, 515, 530; 345/84, 108; 362/318; 40/406; 346/140.1

(56) References Cited

U.S. PATENT DOCUMENTS 3,698,793 A 10/1972 Tellerman
4,001,635 A 1/1977 d'Aurin et al.
4,035,061 A 7/1977 Sheridon
4,182,553 A 1/1980 Sheridon
5,181,016 A 1/1993 Lee
5,233,459 A 8/1993 Bozler et al.
5,717,423 A 2/1998 Parker
5,822,110 A 10/1998 Dabbaj
6,028,978 A 2/2000 Takeuchi et al.
6,037,955 A * 3/2000 DeBoer et al. .......... 346/140.1
6,304,364 B1 10/2001 Qin et al.
2003/0164295 A1 * 9/2003 Sterling ...................... 204/450

* cited by examiner

*Primary Examiner*—Georgia Epps
*Assistant Examiner*—Richard Hanig
(74) *Attorney, Agent, or Firm*—John P McMahon

(57) ABSTRACT

A reflective display system is disclosed that utilizes four overlapping layers of colored dye injected into channels so as to provide a pixel assembly operatively responsive to present an image for human viewing. Each of the four layers contains one color of the CMYK color method. The reflective display system injects packets of colored liquid or transparent fluid into the channels made of transparent material and each channel carries one of the colored liquids. Each of the pixel assemblies is defined by the width of the channel in one direction and the size of the liquid colored packet within the channel in the orthogonal direction. The color of the pixel is defined by the stacking of the liquid dyed colored packets at a particular location when viewed against a white substrate.

18 Claims, 8 Drawing Sheets

REFLECTIVE MICROFLUIDICS DISPLAY PARTICULARLY SUITED FOR LARGE FORMAT APPLICATIONS

FIELD OF THE INVENTION

The invention relates to display subsystems and, more particularly, to a reflective microfluidics display particularly suited for large format applications that relies upon illumination from outside the display to strike the display and illuminate the image thereof, as opposed to an active display that produces illumination from within and consumes relatively more power thereof

BACKGROUND OF THE INVENTION

All displays, whether active or passive, must adhere to a color model. Red, green, blue (RGB) and its subset cyan, magenta, yellow (CMY) form the most basic and well-known color models. These models bear the closest resemblance to how humans perceive color. These models also correspond to the principles of additive and subtractive colors. Although these principles are applicable to all displays, these principles are of particular importance to the present invention and are to be further discussed herein.

Additive colors are created by mixing spectral light in varying combinations. The most common examples of this are television screens and computer monitors, which produce colored pixels by firing red, green, and blue electron guns at phosphors on the television or monitor screen. More precisely, additive color is produced by any combination of solid spectral colors that are optically mixed by being placed closely together, or by being presented to a human viewer in very rapid succession. Under either of these circumstances, two or more colors may be perceived as one color. This can be illustrated by a technique used in the earliest experiments with additive colors: color wheels. These are disks whose surface is divided into areas of solid colors. When attached to a motor and spun at high speed, the human eye cannot distinguish between the separate colors, but rather sees a composite of the colors on the disk.

Subtractive colors are seen by a human viewer when pigments in an object absorb certain wavelengths of white light while reflecting the rest of the wavelengths. Humans see examples of this principle all around them. More particularly, any colored object, whether natural or man-made, absorbs some wavelengths of light and reflects or transmits others; the wavelengths left in the reflected/transmitted light make up the color humans see.

This subtractive color principle is the nature of color print production involving cyan, magenta, and yellow, as used in four-color process printing. The colors cyan (C), magenta (M) and yellow (Y) are considered to be the subtractive primaries. The subtractive color model in printing operates not only with CMY, but also with spot colors, that is, pre-mixed inks.

Red, green, and blue are the primary stimuli for human color perception and are the primary additive colors and the relationship between the colors red, green, and blue, (known in the art) as well as cyan, magenta, and yellow (also known in the art) comprising the CMYK ingredients, where k signifies the color black, can be seen in FIG. 1 herein with regard to illustration 10. The formation of the color related to the RGB and CMYK color principles are shown by the illustration 12 of FIG. 2.

As may be seen in FIG. 2, the secondary colors of RGB, cyan, magenta, and yellow, are formed by the mixture of two of the primaries and the exclusion of the third. For example, red and green combine to make yellow, green and blue combine to make cyan, and blue and red combine to make magenta. The combination of red, green, and blue in full intensity makes white (shown in FIG. 1). White light is created when all colors of the EM spectrum converge in full intensity.

The importance of RGB as a color model is that it relates very closely to the way humans perceive color striking their receptors in their retinas. RGB is the basic color model used in television or any other medium that projects the color. RGB is the basic color model on computers and is used for Web graphics, but is not used for print production.

Cyan, magenta, and yellow correspond roughly to the primary colors in art production: blue, red, and yellow. FIG. 2 also shows the CMY counterpart to the RGB model.

As is known in the art, the primary colors of the CMY model are the secondary colors of RGB, and, similarly, the primary colors of RGB are the secondary colors of the CMY model. However, the colors created by the subtractive model of CMY do not exactly look like the colors created in the additive model of RGB. Particularly, the CMY model cannot reproduce the brightness of RGB colors. In addition, the CMY gamut is much smaller than the RGB gamut.

As seen in FIG. 3 for illustration 14, the CMY model used in printing lays down overlapping layers of varying percentages of transparent cyan, magenta, and yellow inks. As further seen in FIG. 3, white light is transmitted through the inks and reflects off the white surface below them (termed the substrate 16). The percentages of CMY ink (which are applied as screens of halftone dots), subtract inverse percentages of RGB from the reflected light so that humans see a particular color.

In the illustration 14 of FIG. 3 showing one example, the white substrate 16 reflects essentially 100% of the white light which is used for printing in cooperation with a 17% screen of magenta, a 100% screen of cyan, and an 87% screen of yellow. Magenta subtracts green wavelengths from the reflected light, cyan subtracts red wavelengths from the reflected light, and yellow subtracts blue wavelengths from the reflected light. The reflected light leaving the magenta screen, is made up of 0% of the red wavelengths, 44% of the green wavelengths, and 29% of the blue wavelengths.

When the reflected light is used for printing on paper, the screens of the three transparent inks (cyan, magenta, and yellow) are positioned in a controlled dot pattern called a rosette. To the naked eye, the appearance of the rosette is of a continuous tone, however when examined closely, the dots become apparent.

When used in printing on paper, the cyan screen at 100% prints as a solid layer; the 87% layer of yellow appears as green dots because in every case the yellow is overlaying the cyan, forming green. The magenta dots, at 17%, appear much darker because they are mostly overlaying both the cyan and yellow.

In theory, the combination of cyan (C), magenta (M), and yellow (Y) at 100%, create black (all light being absorbed). In practice, however, CMY usually cannot be used alone because imperfections in the inks and other limitations of the process, full and equal absorption of the light are not possible. Because of these imperfections, true black or true grays cannot be created by mixing the inks in equal proportions. The actual result of doing so results in a muddy brown color. In order to boost grays and shadows, and provide a genuine black printers resort to adding black ink, indicated as K in the CMYK method. Thus, the practical application of the CMY color model is a four color CMYK process.

This CMYK process was created to print continuous tone color images like photographs. Unlike solid colors, the halftone dot for each screen in these images varies in size and continuity according to the image's tonal range. However, the images are still made up of superimposed screens of cyan, magenta, yellow, and black inks arranged in rosettes.

In the process involving CMYK printing, though it is chiefly regarded as being dependent upon subtractive colors, the process is also an additive model in a certain sense. More particularly, the arrangement of cyan, magenta, yellow and black dots involved in printing appear to the human eye as colors because of an optical illusion. Humans cannot distinguish the separate dots at normal viewing size so humans perceive colors, which are an additive mixture of the varying amounts of the CMYK inks on any portion of the image surface.

The CMYK process involving the interactions of its ingredients has many benefits. One of the benefits is that the net resulting color does not require an external source, such as found in the RGB process related to active display systems, involving internal electron guns causing the excitation of phosphors on television and monitor displays. It is desired that an inactive display be provided that is free of any internal illumination source, such as electron guns and that uses a CMYK process and the attendant benefits thereof. It is further desired that an inactive display be provided using a CMYK process that serves the needs of outdoor advertising.

OBJECTS OF THE INVENTION

It is a primary object of the present invention to provide an inactive display that is free of any internal illumination source and that uses a CMYK process and is particularly suited to serve the needs of outdoor advertising.

It is another object of the present invention to provide a reflective microfluidics display that utilizes the mixture techniques of the CMYK process to supply an image thereof that may be updated or changed in a relatively rapid manner.

Further still it is another object of the present invention to provide for a reflective display panel responsive to pressurized communication paths.

In addition, it is an object of the present invention to provide a reflective display panel that creates images made up of individual color dots corresponding to those of the CMYK color method and/or the RGB color method.

SUMMARY OF THE INVENTION

The present invention is directed to a reflective microfluidics display system for large format applications that is particularly suited to the needs of indoor and outdoor advertising and utilizes the illumination from outside the display to illuminate the image being displayed.

The reflective display system comprises: a) an arrangement of a plurality of layers stacked on each other and with each layer being transparent and comprising at least one channel having an input port and an output port; b) a plurality of sources of pressurized colored fluids; c) a source of pressurized transparent fluid; d) pneumatic devices connected to each of the input ports of each of the channels for selecting and delivering a pressurized fluid selected from the group comprising the plurality of sources of pressurized colored fluids and the source of pressurized transparent fluid; and e) pneumatic devices connected to each of the output ports of each of the channels for discharging therefrom the fluid connected to the channel and delivering thereof to the same source from which was received.

BRIEF DESCRIPTION OF THE DRAWINGS

Features and advantages of the invention, as well as the invention itself, will become better understood by reference to the following description when considered in conjunction with the accompanying drawings, wherein like reference numbers designate identical or corresponding parts thereof and wherein:

FIG. 5 is composed of FIGS. 5A, 5B and 5C, wherein

FIG. 7 is composed of FIGS. 7A and 7B, wherein

DETAILED DESCRIPTION OF THE PREFERRED EMBODIMENTS

Figure 1:
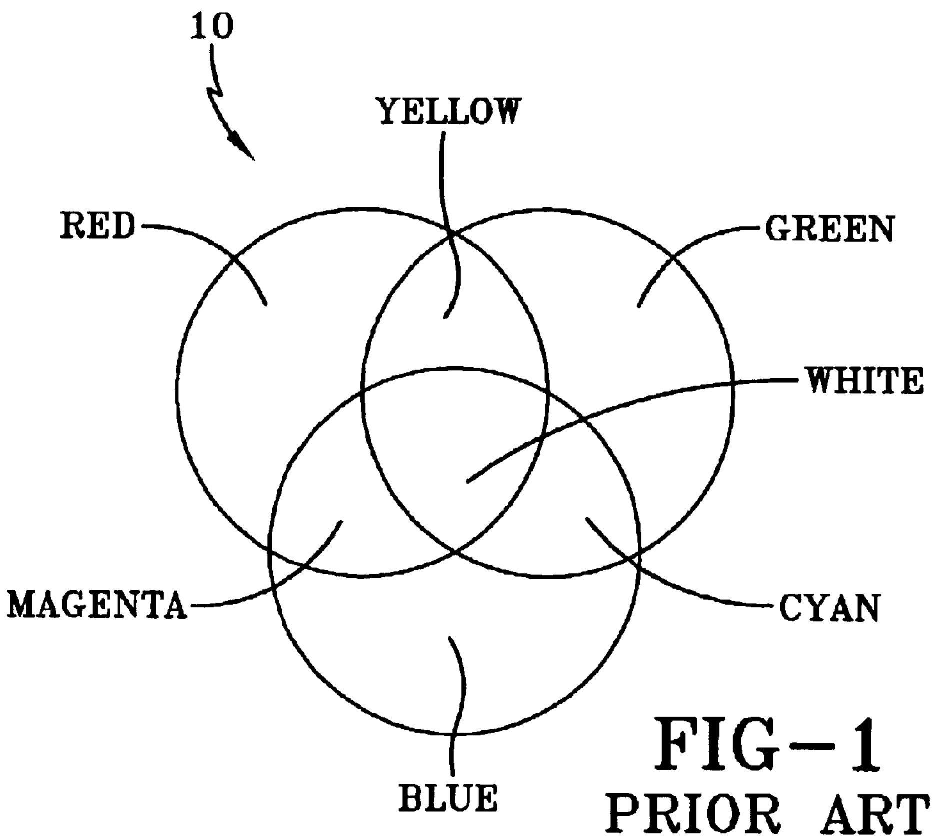
FIG-1 PRIOR ART
FIG. 1 is a prior art illustration showing the interrelationship of the ingredients of the RGB and CMYK color models.
Figure 2:
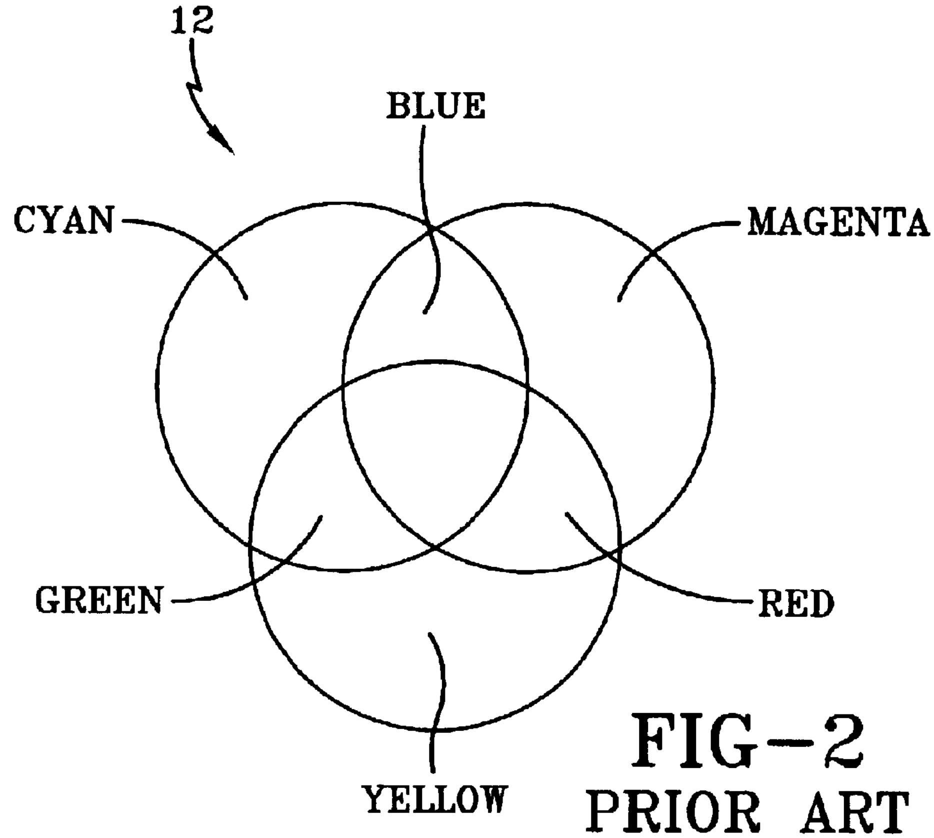
FIG-2 PRIOR ART
FIG. 2 is a prior art illustration showing the color interactions related to the secondary colors of the RGB and CMYK models.
Figure 3:
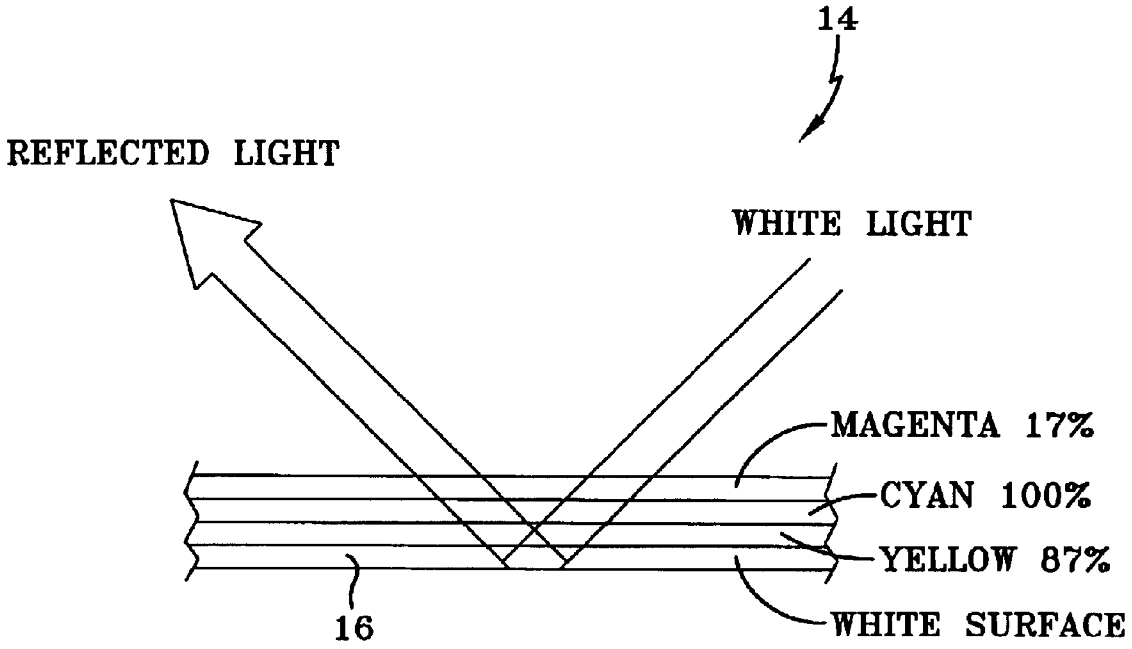
FIG-3 PRIOR ART
FIG. 3 is a prior art illustration showing the interaction of incident and reflected light associated with the CMYK color model.
Figure 4:
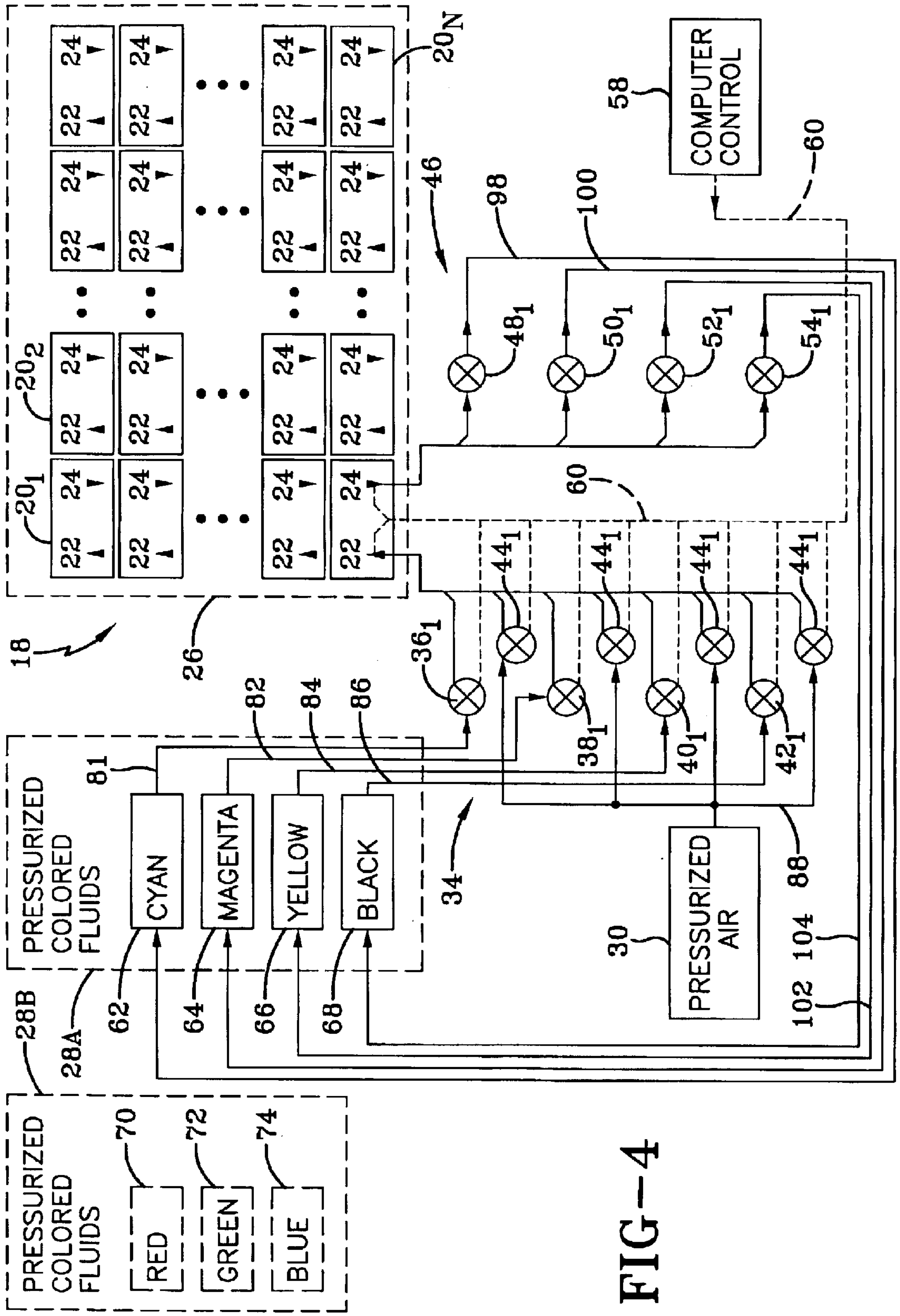
FIG. 4 is a block diagram of the present invention.

Referring to the drawings, FIG. 4 shows a block diagram of a reflective microfluidics display system 18. The reflective microfluidics display system 18 is inactive, in that, it relies on illumination from outside the display to strike the display and illuminate the image as opposed to an active display that produces illumination for the image from within.

The reflective microfluidics display system 18 comprises a plurality of pixel assemblies $\mathbf{20}_1$, 20. . . $\mathbf{20}_N$, each comprised of layers of channels that are formed in an optically clear sheet of material. The clear material may be selected from, but is not limited to, the group consisting of Acrylic and Lexan$^R$. The channels are arranged to cover most of the plane of the associated pixel assemblies.

As will be further described hereinafter, colored liquid packets and transparent fluid packets are serially injected or clocked into the channels from one end. The colored liquid packets and transparent fluid packets traverse the channels until individual entire channels are filled with serial combinations of colored liquid or transparent fluid packets. When placed against a white background or substrate and viewed normal to the plane of the pixel assemblies $\mathbf{20}_1$ . . . $\mathbf{20}_N$, an image made up from the multiple pixel assemblies $20_1$ . . . $20_N$, is presented to a viewer. The image is composed of the colored liquid packets filtering white light. Any image may be formed by clocking into the channels the proper series of colored liquid and transparent fluid packets. Combining and stacking a single color layer with three other color layers corresponding to the CMYK color model result in a fully colored image.

In one embodiment of the present invention, each of the pixel assemblies $20_1$ . . . $20_N$ comprises the four CMYK layers which when taken together correspond to one color in the entire CMYK color space. As in print media, and as previously discussed in the "Background" section, all colors are created as a combination of the three colors cyan, magenta, and yellow with black added to account for imperfections in the inks when all three colors are present. The reflective microfluidics display system 18 stacks layers of channels each fabricated into clear materials. Each layer, in particular the associated channel of the layer, carries one of the colored dyes. Each of the pixel assemblies $20_1$ . . . $20_N$ is defined by the width of the channel in one direction and the size of the liquid dye color packet within the channel in the orthogonal direction. When the pixel assembly is described herein in a general manner, it is referred to as simply pixel assembly 20. The color presented by each of the pixel assemblies $20_1$ . . . $20_N$ is defined by the stacking of liquid dye color packets at that particular location when viewed against a white substrate.

Each of the plurality of pixel assemblies $20_1$, $20_2$, $20_N$ comprises an arrangement of layers stacked on each other, to be further described with reference to FIGS. 5, 6 and 7, with each layer, to be further described with reference to FIGS. 5 and 6, being transparent and comprised of at least one channel having an input port 22 and an output port 24. The plurality of pixel assemblies $20_1$, $20_2$ . . . $20_N$ are preferably arranged on a support structure 26.

The reflective microfluidics display system 19 of FIG. 4 further comprises a plurality of sources 28A and 28B of pressurized color fluid. The present invention is capable of utilizing either of the sources of pressurized fluid 28A or 28B, however, pressurized source 28A will be further described hereinafter with the understanding that the principles described for the pressurized source 28A are also applicable to the source 28B. The display system 18 further utilizes a source 30 of transparent fluid, which is preferably air. The sources 28A, 28B and 30 provide pressurized fluid in the range from about 0 to about 20 psi.

The reflective microfluidics display system 18 further comprises fluid selection pneumatic means 34 having first and second ends, with the first end connected to each of the input ports 22 of the pixel assemblies $20_1$, $20_2$ . . . $20_N$. More particularly, the fluid selection means 34 comprises pneumatic fluid control devices 36, 38, 40, 42 and 44. The pneumatic control devices 36, 38, 40, and 42 are each connected to a pneumatic fluid control device 44 with the output of each combination thereof, as to be further described hereinafter with reference to FIG. 9, connected to a respective input port 22 of the pixel assemblies $20_1$, $20_2$ . . . $20_N$ and are identified with a subscript which correspond to the same subscript as the pixel assemblies $20_1$, $20_2$ . . . $20_N$.

Although the output of each combination of pneumatic fluid control devices, such as $36_2$ and $44_2$, is connected to its respective input port 22, i.e.; input port 22 for pixel assembly 202, for the sake of clarity only the connections for the input port 22 for pixel assembly 20 is shown in FIG. 4. Further, as to be further described with reference to FIGS. 5 and 6, each of the pixel assemblies $20_1$, $20_2$ . . . $20_N$ has a plurality of input ports 22, as well as output ports 24, and each input and output port is connected to its respective combinations of pneumatic fluid control devices. Still further, as will be further described with reference to FIGS. 5 and 6, each pixel assembly $20_1$, $20_2$ . . . . $20_N$ is made up of layers with at least one layer for each color, eg; cyan, magenta, yellow and black, and each layer has an input port 22 so that the output of the combination of pneumatic fluid control devices for each color, such as $36_1$ and $44_1$ for the cyan color, is connected to its respective input port 22 of the layer for the color (cyan) of the associated pixel assembly $20_1$, $20_2$ . . . . or $20_N$. For example, for a pixel assembly 20 having eight (8) layers, all eight (8) layers (Cyan A', Cyan A", Magenta A', Magenta A", Yellow A', Yellow A", Black A", and Black A") will have individual inlet valves, such as $36_1$ and $44_1$ to control the flow of packets into each channel. This arrangement is also applicable for the pneumatic control devices, such as $48_1$, for output port 24 of each layer of each associated pixel assembly $20_1$, $20_2$ . . . $20_N$. The interconnections of the input ports 22 and output ports 24 are to be further described hereinafter with reference to FIG. 7B.

The reflective microfluidics display system 18 further comprises fluid discharge pneumatic means 46 having first and second ends with the first end connected to each end of the output port 24 of each of the pixel assemblies $20_1$, $20_2$ . . . $20_N$. More particularly, the fluid discharge pneumatic means comprises a plurality of pneumatic control devices 48, 50, 52, and 54, each of which has one of its ends connected to the output port 24 of each layer carrying a color, to be described hereinafter for each of the respective pixel assemblies $20_1$, $20_2$ . . . . $20_N$. The pneumatic control devices 48, 50, 52, and 54 of the fluid discharge pneumatic means are identified with subscripts in a manner similar to the pneumatic control devices 36, 38, 40, 42 and 44 of the fluid selection means 34.

The reflective microfluidics display system 18 further comprises a computer control 58 that generates control signals that are delivered on signal cable 60 connected to all of the pneumatic control devices 36, 38, 40, 42 and 44 of the fluid selection pneumatic means 34, and to all of the pneumatic control devices 48, 50, 52, and 54 of the fluid discharge means 46. The computer control 58 provides control signals, in accordance with the routine running within the computer control 58 so that the control signals individually control each of the pneumatic control devices 36, 38, 40, 42 and 44, and 48, 50, 52, and 54 of the fluid discharge means 46. If desired, for metering purposes, to be further described hereinafter with reference to FIG. 9, the control signals may be integrated for various combinations thereof.

The pressurized source 28A comprises pressurized reservoirs 62, 64, 66, and 68 of color fluid respectively consisting of a cyan color, a magenta color, a yellow color, and a black color. The color liquids of reservoirs 62, 64, 66, and 68 are used by the reflective microfluidics display system 18, so as to act as optical filters. Each of the liquids must absorb the optical frequencies desired and pass the remaining frequencies. It is preferred that each of the colored liquids of reservoirs 62, 64, 66, and 68 be of a water-based transparent ink, which are commercially available. If desired colored water could be used, but may lead to problems if the reflective microfluidics display system 18 is used in hot/cold environments. For example, in cold environments, the colored water may freeze while in hot environments the colored water may promote bacterial growth. Both of these problems are readily solved with the addition of ethylene glycol. It is preferred that a 50/50 mixture of colored water and ethylene glycol be used for either of the water-based transparent ink or colored water itself. The hot and cold environment problems may also be overcome by using a non-water-based ink or dye.

In another embodiment of the present invention, the reflective display system 18 may use a source 28B of pressurized reservoirs 70, 72, and 74 respectively containing the colored fluids red, green and blue. The liquid used for the colors red, green and blue may be the same liquid used for the colors of reservoirs 62, 64, 66, and 68. All of the colors of source 28A and 28B, as well as the transparent fluid 30 are injected into the pixel assemblies $20_1, 20_2 \ldots 20_N$ having different embodiments, one of which embodiment may be further described with reference to FIG. 5 which is composed of FIGS. 5A, 5B, and 5C and showing an embodiment 20A.

Figure 5A:
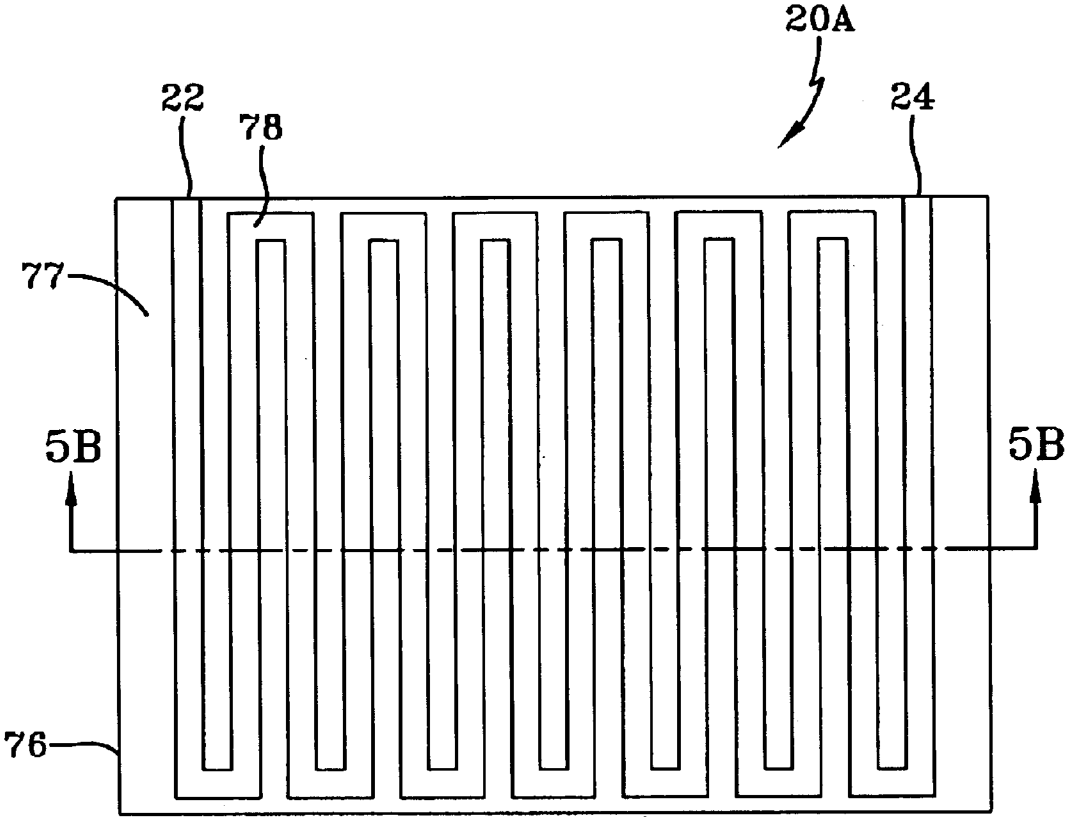
FIG. 5A is a top view of a single layer associated with the device of the present invention.
Figure 5B:
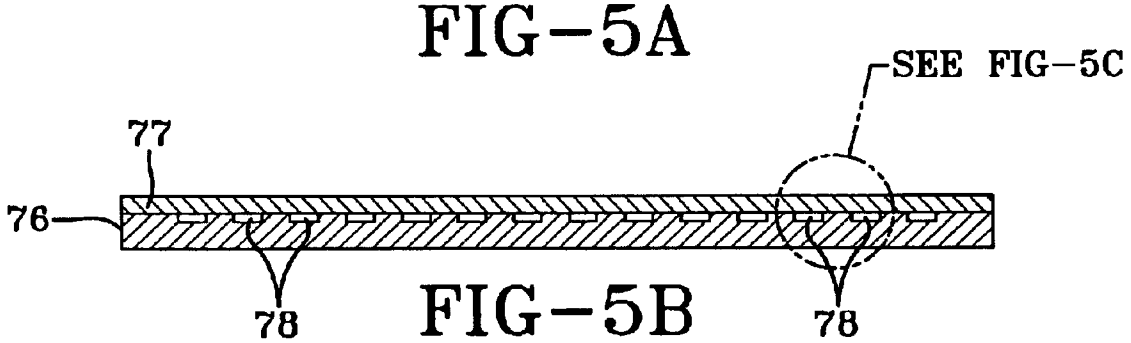
FIG. 5B is cross-sectional view taken along line 5B—5B of FIG. 5A
Figure 5C:
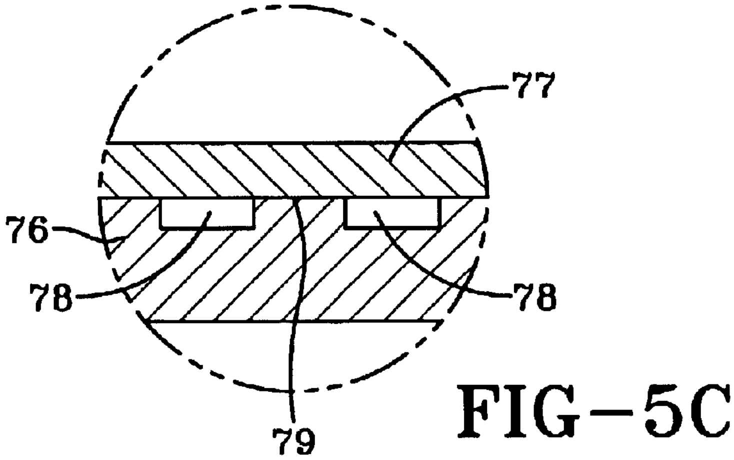
FIG. 5C is an enlarged view of a portion of FIG. 5B.

FIG. 5A is a top view of one layer 76 having a cover plate 77 arranged thereon, and both devices of which are comprised of a transparent material. FIG. 5B is a cross-sectional view taken along line 5B—5B of FIG. 5A and FIG. 5C is an enlarged view of a portion of FIG. 5B. The transparent layer 76 has at least one channel 78 also comprised of a transparent material and interconnected to the input port 22 and output port 24 of the pixel assemblies $20_1 \ldots 20_N$, previously described with reference to FIG. 4. As seen most clearly in FIG. 5B, the cover plate 77 provides the structure for defining the channel 78 allowing the channel 78 to carry a color ink or air. The channel 78 is shown in FIG. 5 as being free of any color within its confines.

FIG. 5 illustrates the shape of the channel 78 as being continuous and having a serpentine pattern. However, other patterns may be selected to include a spiral pattern or a set of long straight channels set side by side. All of the patterns may comprise individual shapes selected from the group comprising rectangular, round and oval. Channel 78 is typically wider than it is deep. Typical dimensions of each of the channels is 0.125 inches wide by 0.020 inches deep and are more clearly shown in FIG. 5C.

Although the single arranged layer 76 has patterns that provide relatively good coverage, the entire viewing coverage is not met because the layer 76 needs a wall 79 between the channels keeping them separate. A farther embodiment 20B for the pixel assemblies $20_1 \ldots 20_N$, may be further described with reference to FIG. 6 composed of FIGS. 6A and 6C.

Figure 6A:
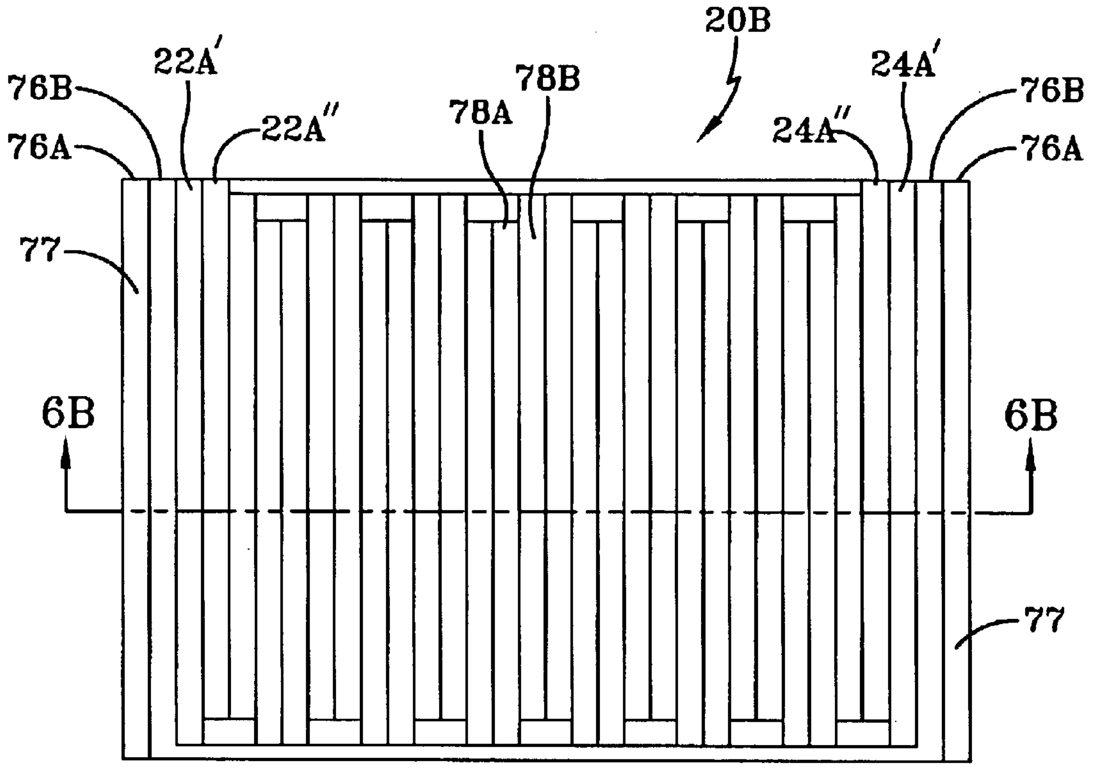
FIG. 6 is composed of FIGS. 6A, 6B and 6C, and respectively show a top view, a side view taken along line 6B—6B of FIG. 6A, and an enlarged view of a portion of FIG. 6B.
Figure 6B:
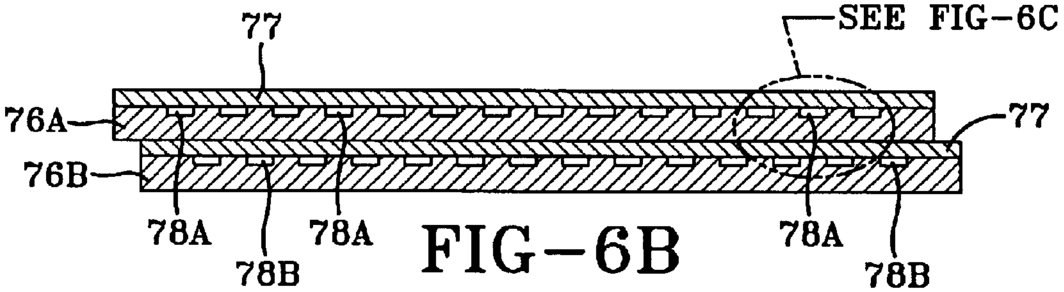
Figure 6C:
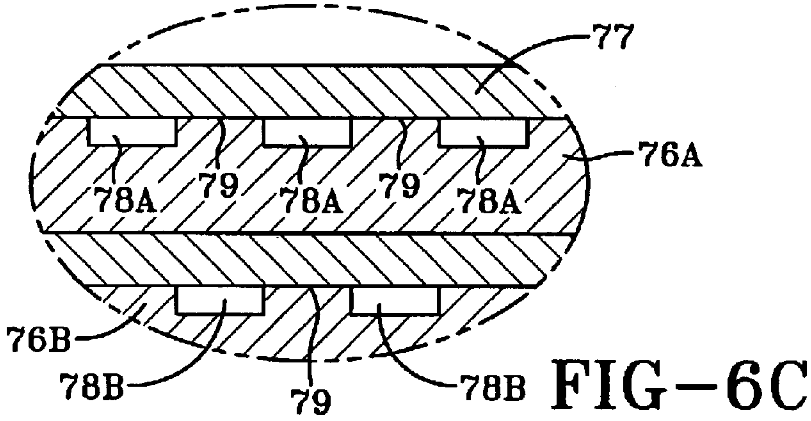

FIG. 6A is a top view of two layers 76A and 76B with the layer 76 having a cover plate 77 arranged thereon in a manner as previously described with reference to FIG. 5B. The two layers 76A and 76B, respectively have channels 78A and 78B with the layers 76A and 76B stacked and offset from each other. FIG. 6B is a cross-sectional view taken along lines 6B—6B of FIG. 6A and shows that the cover plate 77 provides the structure for defining the channel 78A of layer 76A, whereas the first layer 76A provides the structure for defining the channel 78B of layer 76D. The arrangement of the first layer 76A defining the channel 78B of layer 76A is most clearly shown in FIG. 6C.

As seen in FIG. 6, one layer 76A is offset with respect to the other layer 76B, so as to provide a more complete viewing coverage by way of channels of 78A and 78B when viewed normal to plane of layers 76A and 76B. As an example, and as will be further described hereinafter with reference to FIGS. 7, 8 and 9, the entire plane will present a yellow color with the channels 78A and 78B in both layers 76A and 76B are filled with, for example, a yellow liquid. The layers 76A and 76B, respectively have input ports 22A' and 22A", each connected (not shown) to fluid selection pneumatic devices 34 and output ports 24A' and 24A", each connected (not shown) to fluid discharge pneumatic devices 46. The four stacked arrangement of the pixel assembly 20 may be further described with reference to FIG. 7 composed of FIGS. 7A and 7B.

Figure 7A:
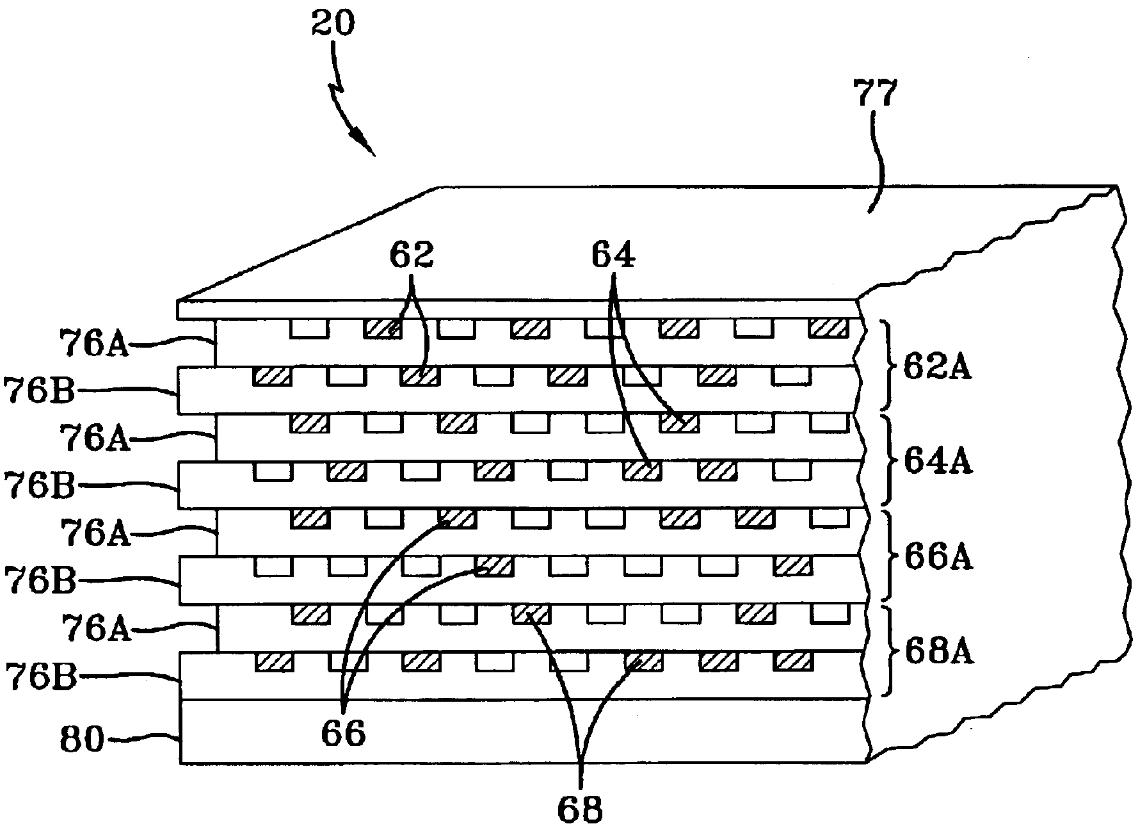
FIG. 7A is a cross-sectional view of four pairs of stacked channel layers making up one of the pixel assemblies of the present invention and FIG. 7B illustrates the interconnections of the input and output ports of each of the four stacked layers.

FIG. 7A is a cross-sectional view of pixel assembly 20 comprised of eight layers, arranged into four groups of two layers 76A and 76B with the groups identified as 62A, 64A, 66A and 68A. Each group 62A, 64A, 66A and 68A contains a respective color of reservoirs 62 (cyan), 64 (magenta), 66 (yellow), and 68 (black).

Figure 7B:
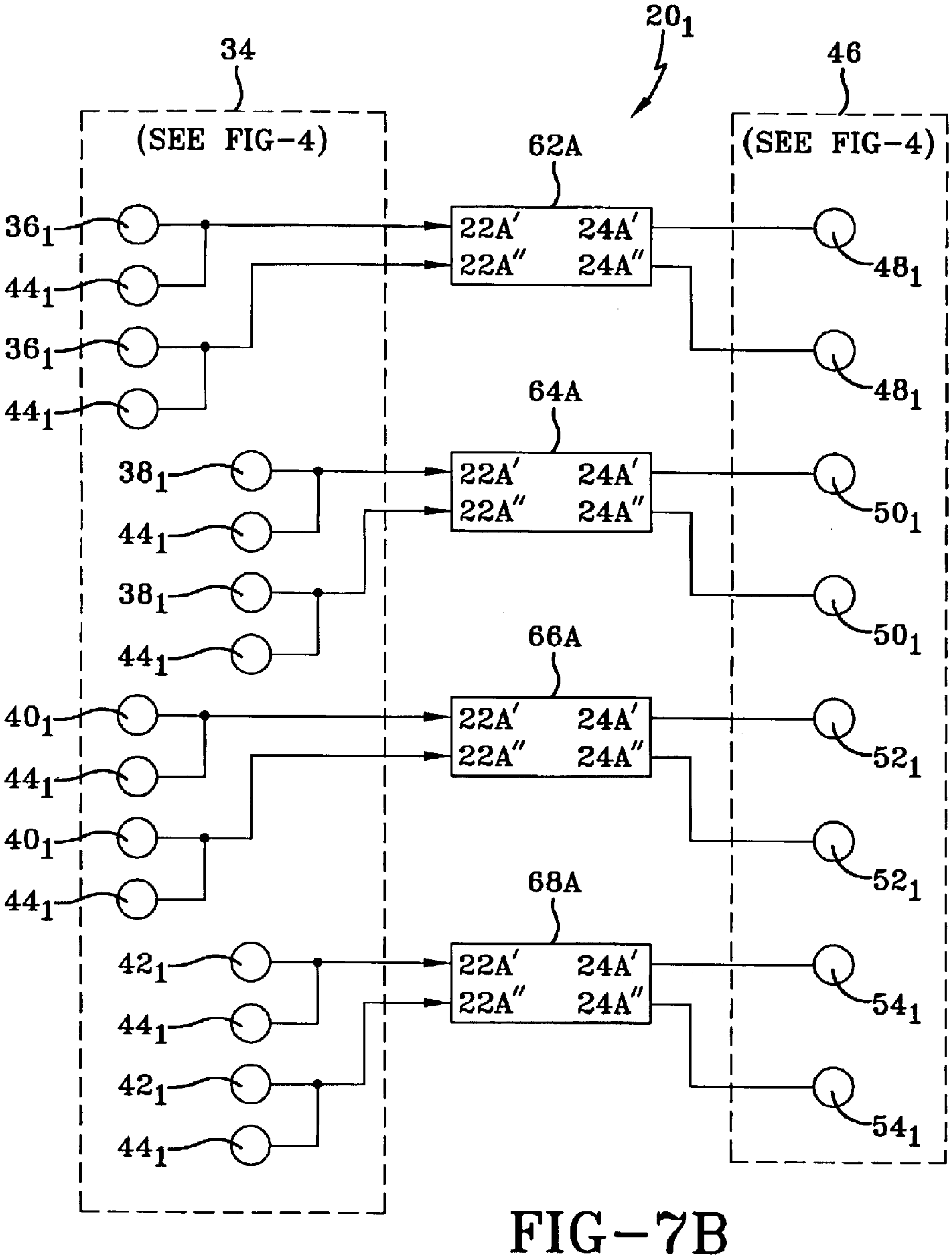

As previously discussed somewhat with reference to FIG. 6, each layer 76A and 76B of each group 62A, 64A, 66A and 68A, respectively has input ports 22A' and 22A", as well as output ports 24A' and 24A". Further, as previously discussed with reference to FIG. 4, each input port 22A' and 22A" is connected to fluid selection means 34 and each output port 24A' and 24A" is connected to fluid discharge means 46. A representative arrangement of the input and output ports 22 and 24, respectively, is shown in FIG. 7B for pixel assembly 20, with the understanding that the arrangement of FIG. 7B is equally applicable to the remaining pixel assemblies $20_2, 20_3 \ldots 20_N$.

In operation, and in general, each of the groups 62A, 64A, 66A, and 68A is injected with packets of colored liquid and transparent fluid, such as air that are serially moved into the channels 78 to form an image presented by a plurality of pixel assemblies $20_1, 20_2 \ldots 20_N$ when viewed normal to the plane of the reflective display system 18. Any linear sequence of colored liquid and air packets may be injected into a channel 78. When viewed normal to the plane of the channels 78 and placed against a white substrate 80, shown in FIG. 7, the collection of colored liquid packets and transparent air packets contained within the four groups 62A, 64A, 66A and 68A produces an image of that of a single color only. A presentation made by a complete pixel assembly 20 is the overlapping of packets in all four groups 62A, 64A, 66A and 68A So, by exerting a force on the liquids of the reservoirs 62, 64, 66, and 68, so as to pressurize the associated liquid in a periodic or clocked manner, the appropriate packets of liquids and air from reservoirs 62, 64, 66, 68 and 30 are delivered into each of the eight layers 76 in four groups 62A, 64A, 66A and 68A, thereby causing a full CMYK color image to be created when viewed normal to the plane of the channels 78. It should be recognized that the groups 62A, 64A, 66A, and 68A make up one pixel assembly 20 which, in turn, make up one color of an overall image that is presented for human viewing. Further details of the operation of the present invention may be further described with reference to FIGS. 4, 8, and 9.

Figure 8A:
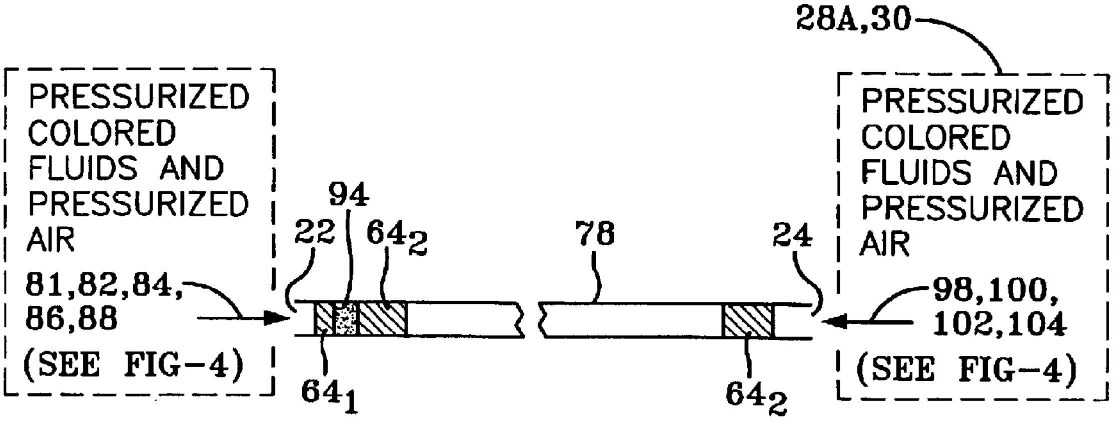
FIG. 8 is composed of FIGS. 8A and 8B each illustrating the movement of packets of colored liquid and transparent fluid through the pixel assembly of the present invention.
Figure 8B:
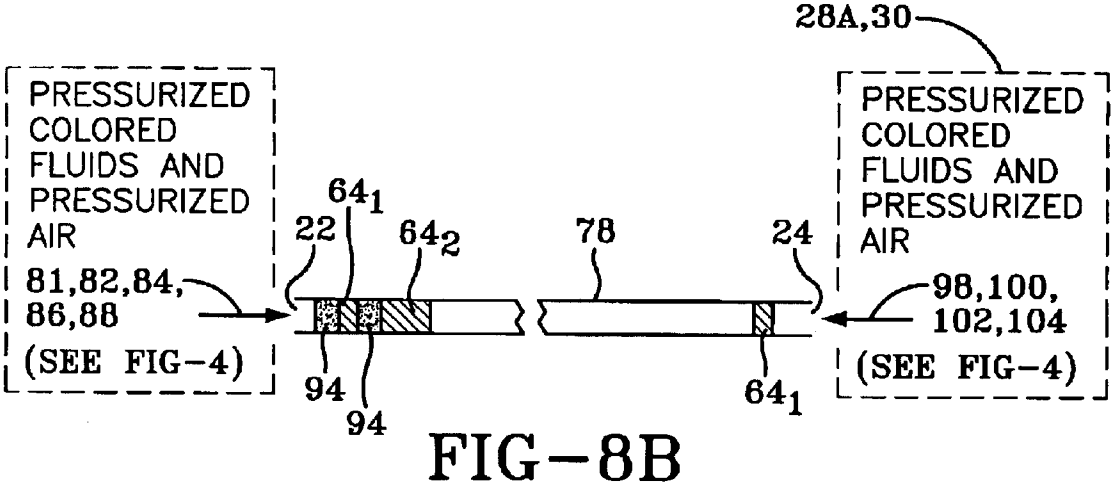
Figure 9:
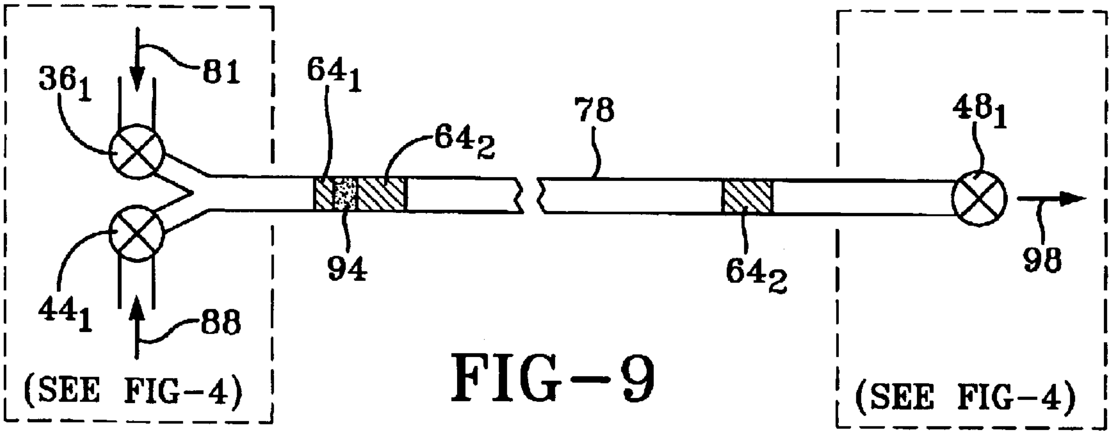
FIG. 9 is a schematic view showing one embodiment involved in transporting color liquid and air packets through the pixel assembly of the present invention.

FIGS. 8 and 9 show fluid communication paths 81, 82, 84, 86 and 88, connected to the input port 22 and output port 24 connected to fluid communication paths 98, 100, 102 and 104. These fluid communication paths 81, 82, 84, 86, 88, 98, 100, 102 and 104 are involved to cover the movement of all colors, cyan, magenta, yellow and black. However, for the sake of clarity, FIGS. 8 and 9 illustrate the movement of examples associated with the color magenta designated with the reference number 64 and associated subscripts.

More particularly, FIGS. 8 and 9 illustrate that input port 22 has interjected thereto a single colored packet $64_1$, a transparent air packet 94, and two colored packets $64_2$ that transverse the channel 78 and exit from the output port 24 to be discharged into fluid communication path 100, also shown in FIG. 4. Both the single color packet $64_1$, and double colored packet $64_2$ are delivered from reservoir 64, by way of fluid communication path 84, for the example shown in FIGS. 8 and 9.

As seen in FIG. 4, fluid communication paths 81, 82, 84, and 86 each has one of its ends connected to the cyan color, magenta color, yellow color, black color, respectively-contained in reservoirs 62, 64, 66, 68, and 30. The other ends of the fluid communication paths 81, 82, 84, 86, are respectively connected to the pneumatic valves 36, 38, 40, and 42. Fluid communication path 88 has one of its ends connected to the output of the pressurized air 30 and its other end connected to each of the pneumatic control devices 44, that is interconnected with the combinations formed with pneumatic control devices 36, 38, 30, and 42. As further seen in FIG. 4, the fluid communication paths 98, 100, 102, and 104 each has one of its ends respectively connected to the pneumatic control devices 48, 50, 52, and 54 of the fluid discharge pneumatic means 46. The fluid communication paths 98, 100, 102, and 104 have their other ends respectively connected to the reservoir 62 of the color cyan, the reservoir 64 of the color magenta, the reservoir 66 of the color yellow, and the reservoir 68.

Packets of colored liquid for the example shown in FIGS. 8 and 9, from reservoir 64, are injected into the channel 78 at the input port 22, but it should be recognized that under normal operating conditions, packets of colored liquids from reservoirs 62, 64, 66, and 68 are injected into the channel 78 at input ports 22 of the associated pixel assembly 20. Packets of air from pressurized source 30 are also injected at the input port 22 by way of fluid communication paths 81, 82, 84 and 86, but for the example of FIGS. 8 and 9 the air is injected by way of fluid communication path 84. The air packets from source 30 are injected to displace any colored liquid. As a packet of colored liquid or air is injected, it forces all preceding packets therein to move one location further down the channel 78. As the packets of liquid color or transparent air reach the output port 24 of the channel 78, these packets exit the channel 78, wherein the discharged fluid goes back out into the associated reservoir 62, 64, 66, or 68. Atypical operation, for one example, may be further described with reference to FIG. 8 composed of FIGS. 8A and 8B.

FIG. 8A shows a single packet $64_1$ of magenta liquid that is the last to have been injected into the channel 78. Prior to that, was a single packet 94 of air was injected and prior to that two packets $64_2$ of magenta liquid had been injected. FIG. 8A also illustrates two packets $64_2$ of magenta fluid approaching the exit port 24, so as to be discharged into the fluid communication path 100. The associated color packets entering the input port 22 from reservoirs 62, 64, 66, and 68 are discharged from output port 24 and returned to their respective reservoir 62, 64, 66, or 68. The continuation of the events of FIG. 8A may be further described with reference to FIG. 8B.

FIG. 8B shows how the injection of air packets 94 moves the packets $64_1$ and $64_2$ that have preceded it further down into the channel 78. FIG. 8B also shows how one packet of fluid 64, is exiting the channel in a response to one packet of air 94 entering the channel 78.

The packets of colored liquid and air may be injected into the channel 78 in several ways. The most direct way is to pressurize the liquid or air and use a valve to meter the quantity based on time alone. This approach allows for a relatively simple arrangement, but without any advantageous feedback. Other methods of metering may employ pumps, valves, and metering chambers. One method of injecting the colored liquid and air into the channel 78 may be further described with reference to FIG. 9.

FIG. 9 illustrates the pneumatic controls 36 and 44, using the subscript 1 so as to be identified with the representative pixel assembly $20_1$, respectively connected by fluid communication paths 81 and 88 of the reservoir 62 and the pressurized air 30. Each of the control valves 36, and 44, and 48, are connected to the computer control 58 via signal cable 60 and are responsive to the control signals generated by the control computer 58 operating in response to a routine, not shown, but of a conventional nature. When the valves 36, 38, 40, or 42 are used to provide a metering assembly, the computer control 58 generates a combination of control signals selectable from control signals to provide a unison operation of the metering assembly.

In operation, and again with reference to FIG. 9, the exit valves comprised of valves 36 and 48, are desired to open immediately prior to the introduction of a packet of air 94 or any of the color packets, such as packet $64_1$ and $64_2$. This allows a packet to leave at the output port 24 as the packet enters the input port 22. The exit valve $48_1$ (shown in FIG. 9) should be closed immediately after the packet, such as packet $64_2$ has left the output port 24. The clocking in of the air and liquid packets into the channel may be facilitated by the application of vacuum pressure at the exit point (i.e., while the exit valve, such as $48_1$, is opened).

It is preferred that for the larger arrangements of the channel 78, both ends of the channel 78 should be sealed by valves, such as those shown for input valves $36_1$, and $44_1$, and output valve $48_1$, so as to prevent the liquid and air packets within the channel 78 from moving over time.

It should now be appreciated that the practice of the present invention provides for a display system that utilizes a CMYK process involving the interaction of ingredients having many benefits. One of the benefits is that the resulting color does not require any external source, such as found in the RGB process related to active display systems, involving internal electron guns causing the excitation of phosphors of television and monitor displays. The present invention provides an inactive display that is free of any internal illumination, such as electronic guns and utilizes a CMYK process and its attendant benefits thereof The display system is an inactive display and provides benefits that serve large formal applications found in both indoor and outdoor advertising.

The invention has been described with reference to the preferred embodiments and alternatives thereof. It is believed that many modifications and alterations to the embodiments as discussed herein will readily suggest themselves to those skilled in the art upon reading and understanding the detailed description of the invention. It is intended to include all modifications and alterations insofar as they come within the scope of the present invention.

We claim:

1. A display system comprising:

a) a plurality of pixel assemblies each comprising:

$a_1$) an arrangement of a plurality of layers stacked on each other and with each layer being transparent and comprising at least one channel having an input port and an output port;

b) a plurality of sources of pressurized colored fluids;

c) a source of pressurized transparent fluid;

d) pneumatic devices connected to each of said input ports of each of said channels for selecting and delivering thereto a pressurized fluid selected from the group comprising said plurality of sources of pressurized colored fluids and said source of transparent fluid; and e) pneumatic devices connected to each of said output ports or each of said channels for discharging therefrom the fluid connected to said channel and delivering the discharged fluid to the same source from which it was received.

2. The display system according to claim 1, wherein said transparent fluid is air and wherein plurality of sources of pressurized color fluids consists of colors red, green and blue.

3. The display system according to claim 1, wherein said transparent fluid is air and wherein plurality of sources of pressurized color fluids consists of the colors cyan, magenta, yellow and black.

4. The display system according to claim 1, wherein said arrangement of said stacked layers has a bottommost layer and wherein said display system further comprises a white substrate upon which said bottommost layer rests.

5. The display system according to claim 3, wherein said arrangement comprises four layers respectively connected to said cyan colored fluid and said air, said magenta colored fluid and said air, said yellow colored fluid and said air, and said black colored fluid and said air.

6. The display system according to claim 5, wherein each of said layers comprises at least two offset and overlapping channels.

7. The display system according to claim 1, wherein said transparent channels are arranged to have a configuration selected from the group consisting of a serpentine pattern, a spiral pattern and a set of long straight passageways set side by side.

8. The display system according to claim 7, wherein the selected configuration of the transparent channels has shapes selected from the group consisting of rectangular, round and oval.

9. The display system according to claim 1, wherein said transparent channels have width and depth dimensions of about 0.125 inches and 0.020 inches respectively.

10. The display system according to claim 1, wherein said transparent channels are of an optically clear material.

11. The display system according to claim 10, wherein said optically clear material is plastic selected from the group consisting of acrylic and Lexan$^{R}$.

12. The display system according to claim 3, wherein each colored fluid is a non-water-based transparent ink.

13. The display system according to claim 3, wherein each colored fluid is a mixture of about 50/50 of colored water and ethylene glycol.

14. The display system according to claim 1, wherein each input and output of each layer is hermetically sealed by a valve.

15. A method of displaying images for human viewing comprising the steps of:

a) providing a plurality of pixels with each pixel being an arrangement of a plurality of layers stacked on each other and with each layer being transparent and comprising at least one channel having an input port and an output port;

b) providing a plurality of sources of pressurized colored fluids;

c) providing a source of pressurized transparent fluid;

d) providing fluid selection pneumatic devices having first and second ends with the first ends responsive to a control signal and connected to each of said inputs of each of said channels for selecting and delivering thereto a pressurized fluid selected from the group comprising said plurality of sources of pressurized colored fluids and said source of transparent fluid;

e) providing fluid discharge pneumatic devices each responsive to a control signal and connected to each of said outputs or each of said channels for discharging therefrom the fluid connected to said channel to the same source from which it was delivered;

f) connecting said second ends of said fluid selection pneumatic devices to one end of a metering respective means responsive to a control signal and having its other end connected to respective source of pressurized fluid;

g) connecting said second ends of said fluid discharge pneumatic devices to a respective source of pressurized fluid;

h) connecting said fluid selection pneumatic devices, said fluid discharge pneumatic devices and said metering means to computer control means; and i) operating said computer to generate control signals so that packets of colored fluids and packets of transparent fluid separately enter and traverse each of said channel in a predetermined manner to produce an image for said human viewing.

16. The method according to claim 15, wherein said fluid selection pneumatic devices and said fluid discharge pneumatic devices have opening and closing operations and wherein said computer control causes the operations of said fluid selection pneumatic devices and said fluid discharge pneumatic devices so that fluid discharge pneumatic devices are operated to open substantially immediately prior to the opening operation of said fluid selection pneumatic devices and then said fluid discharge pneumatic devices are operated so as to be closed.

17. The method according to claim 16, wherein said fluid selection pneumatic devices are operated while said fluid discharge pneumatic devices are opened so that the transparent fluids and colored fluids are facilitated into said channels.

18. The method according to claim 15, wherein said metering means is selected from the group of devices consisting of pumps, valves and metering chambers.

* * * * *